United States Patent
Sugiyama et al.

(10) Patent No.: US 11,501,768 B2
(45) Date of Patent: Nov. 15, 2022

(54) DIALOGUE METHOD, DIALOGUE SYSTEM, DIALOGUE APPARATUS AND PROGRAM

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Hiromi Narimatsu, Soraku-gun (JP); Yuichiro Yoshikawa, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 168 days.

(21) Appl. No.: 16/490,928

(22) PCT Filed: Jan. 26, 2018

(86) PCT No.: PCT/JP2018/002501
§ 371 (c)(1),
(2) Date: Sep. 4, 2019

(87) PCT Pub. No.: WO2018/163645
PCT Pub. Date: Sep. 13, 2018

(65) Prior Publication Data
US 2020/0013403 A1    Jan. 9, 2020

(30) Foreign Application Priority Data
Mar. 10, 2017   (JP) .............................. JP2017-046365

(51) Int. Cl.
*G10L 15/22*  (2006.01)
*G06F 3/01*   (2006.01)
(Continued)

(52) U.S. Cl.
CPC .............. *G10L 15/22* (2013.01); *G06F 3/011* (2013.01); *G06F 3/16* (2013.01); *G10L 13/00* (2013.01); *G10L 2015/223* (2013.01)

(58) Field of Classification Search
USPC ................................. 704/246, 247, 251, 252
See application file for complete search history.

(56) References Cited

U.S. PATENT DOCUMENTS

2008/0232575 A1* 9/2008 Gumbula .......... H04M 3/42221
                                                   379/265.11
2009/0086933 A1* 4/2009 Patel ................... G10L 21/0208
                                                         379/52
(Continued)

FOREIGN PATENT DOCUMENTS

JP     2004-46400      2/2004
JP     2016-133557 A   7/2016

OTHER PUBLICATIONS

Kawahara, T. et al, "Toward Dialogue System with Conversational Utterance," Information Processing, vol. 45, No. 10, Oct. 2004, pp. 1027-1031, (19 total pages with English translation).
(Continued)

*Primary Examiner* — Leonard Saint-Cyr
(74) *Attorney, Agent, or Firm* — Oblon, McClelland, Maier & Neustadt, L.L.P.

(57) ABSTRACT

It is an object of the present invention to promote a user's understanding or agreement, and to cause a dialogue to last long. A dialogue system 100 conducts a dialogue with a user 101. A humanoid robot 50-1 presents a first utterance which is a certain utterance. When the user 101 performs an action indicating that the user cannot understand the first utterance or it is predicted that the user performs an action indicating that the user cannot understand the first utterance or when the user does not perform any action indicating that the user can understand the first utterance, or it is predicted that the (Continued)

user will not perform any action indicating that the user can understand the first utterance, then the humanoid robot 50-1 presents a second utterance which is at least one utterance resulting from paraphrasing the contents of the first utterance.

10 Claims, 3 Drawing Sheets

(51) Int. Cl.
*G06F 3/16* (2006.01)
*G10L 13/00* (2006.01)

(56) References Cited

U.S. PATENT DOCUMENTS

| | | | | |
|---|---|---|---|---|
| 2010/0049517 | A1* | 2/2010 | Huang | H04M 3/4936 |
| | | | | 704/251 |
| 2013/0060566 | A1* | 3/2013 | Aoyama | G10L 15/22 |
| | | | | 704/231 |
| 2016/0042735 | A1* | 2/2016 | Vibbert | G10L 15/222 |
| | | | | 704/257 |
| 2016/0343378 | A1* | 11/2016 | Chen | G06F 16/3329 |
| 2016/0351193 | A1* | 12/2016 | Chen | G06F 16/3329 |
| 2017/0113353 | A1* | 4/2017 | Monceaux | G10L 15/26 |
| 2017/0125008 | A1* | 5/2017 | Maisonnier | G06N 3/008 |
| 2018/0090145 | A1* | 3/2018 | Kume | G10L 15/22 |

OTHER PUBLICATIONS

Arimoto, T. et al, "Impression Evaluation of Dialogue without Voice Recognition by Plural Roots," Conference of the Robotics Society of Japan, Sep. 13, 2016, (9 total pages with partial English translation).

Sugiyama, H. et al, "Leveraging Dependency Relations and Sentence Examples in Web-scale Corpus for Open-domain Utterance Generation," Transactions of the Japanese Society for Artificial Intelligence, 2015, vol. 30 (1), pp. 183-194, (22 total pages with partial English translation).

Meguro, T. et al, "Building a conversational system on the fusion of rule-based and stochastic utterance generation," Proceedings of the 28$^{th}$ Annual Conference of the Japanese Society for Artificial Intelligence, 2014, vol. 28, pp. 1-4, (8 total pages with partial English translation).

Ohno, et al, "Extraction of Agreement/Disagreement Expressions From Twitter," 18$^{th}$ annual meeting of the Association for Natural Language Processing, Mar. 2012, pp. 89-92, (6 total pages with partial English translation).

Hirayama, T. et al, "Effect of Approach with Face-turning Action on Timing of Agreement/Disagreement Response in Human-human Interaction," Journal of Human Interface Society, vol. 0, No. 0, 2008, pp. 385-394, (30 total pages with partial English translation).

International Search Report dated Apr. 17, 2018 in PCT/JP2018/002501 filed on Jan. 26, 2018.

Japanese Final Office Action dated Apr. 20, 2021 in Japanese Patent Application No. 2019-504379 (with unedited computer generated English translation), 8 pages.

Iio, T., et al., "Multi-robot dialog system for attracting user interest in conversation", The Institute of Electronics, Information and Communication Engineers, vol. 115, No. 283, Oct. 2015, pp. 29-32 with cover page (with English abstract).

* cited by examiner

DIALOGUE METHOD, DIALOGUE SYSTEM, DIALOGUE APPARATUS AND PROGRAM

TECHNICAL FIELD

The present invention relates to a technique applicable to robots or the like communicating with humans allowing a computer to have a dialogue with humans using a natural language or the like.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, show the resident having dialogue with the robot, and have chances to start dialogue between the resident and people around the resident such as his/her family and nurses. In addition, at the site of communication training, for example, there is a usage pattern in which a robot becomes a training partner. More specifically, the robot becomes a training partner for foreign language learners at foreign language learning facilities, thus helping the foreign language learners to efficiently proceed with foreign language learning. Furthermore, in an application as an information presentation system, robots have a dialogue with each other and have their dialogue heard by people as a basis, sometimes talk to people, cause the people to join in dialogue without making the people bored, and can thereby present information in a form easily acceptable to the people. More specifically, when people feel bored at meeting places, a bus stop, a platform at a station or the like in a town or when people can afford to participate in a dialogue at home, a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialogue through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among the users. By applying a technique of dialogue between users and robots to this chat service, it is possible to implement a chat service whereby robots can have dialogue with users more naturally even in the absence of any user as a chatting partner.

In the present specification, hardware which becomes a dialogue partner of a user such as robots used in these services or chatting partner or computer software for causing a computer to function as hardware to become the user's dialogue partner are generically called an "agent." Since the agent is intended to become the user's dialogue partner, the agent may be personified such as a robot or chatting partner, personalized or may possess characters or individuality.

The key to the implementation of these services is a technique that enables the agent implemented by hardware or computer software to have a dialogue with humans naturally.

An example of the above-described agent is a voice dialogue system described in Non-Patent Literature 1 that voice-recognizes a user utterance, understands/infers intention of the utterance and gives an appropriate response. Research on voice dialogue systems has been actively carried out with the development of voice recognition technology and has been put to practical use in automatic voice response systems, for example.

Another example of the above-described agent is a scenario dialogue system that has a dialogue with a user about a specific topic in accordance with a predetermined scenario. The scenario dialogue system allows the user to continue a dialogue as long as the dialogue develops in accordance with the scenario. For example, a dialogue system described in Non-Patent Literature 2 is a system that develops a dialogue between a user and a plurality of agents while including interruptions by the agents or exchanges between the agents. For example, an agent utters a question prepared in a scenario to the user and when the utterance of an answer from the user to the question corresponds to an option prepared in the scenario, the agent functions to make an utterance corresponding to the option. That is, the scenario dialogue system is a dialogue system in which the agent makes an utterance based on a scenario stored in advance in the system. In this dialogue system, the agent asks a question to the user, and when the agent receives an answer from the user, the agent may fend off the question by nodding "I see" regardless of contents of the user utterance or the agent may interrupt the dialogue by changing the topic, and can thereby respond in such a way that even when the user utterance is deviated from the original topic, the user will not feel a breakup of the story.

A further example of the above-described agent is a chat-oriented dialogue system in which the agent makes an utterance along with utterance contents of the user so that the user and the agent develop a natural dialogue. For example, a dialogue system described in Non-Patent Literature 3 is a system for implementing a chat-oriented dialogue between the user and the system in which while focusing on matters peculiar to the context in a plurality of dialogues made between the user and agent, the system makes an utterance according to a prescribed rule using a word included in the utterance of the user or agent as a trigger. The rule used by the chat-oriented dialogue system is not only the prescribed one but may also be one automatically generated based on contents of the user utterance or may be one automatically generated based on an immediately preceding utterance made by the user or agent or an utterance made in the vicinity thereof or may be one automatically generated based on an utterance at least including an immediately preceding utterance made by the user or agent or an utterance made in the vicinity thereof. Non-Patent Literature 3 describes a technique of automatically generating a rule based on words in a co-occurrence relation or in a dependency relation with words included in a user utterance. A dialogue system described, for example, in Non-Patent Literature 4 is a system in which a manually described rule is merged with a rule described using a statistical utterance generation technique to thereby reduce the rule generation cost. Unlike the scenario dialogue system, the chat-oriented dialogue system is not such a system in which the agent makes an utterance in accordance with a prepared scenario, and so there will be no such situation that the agent's utterance does not correspond to the user utterance and the agent can make an utterance based on at least contents of the user utterance or an immediately preceding utterance made by the user or agent or an utterance made in the vicinity thereof. That is, the chat-oriented dialogue system is a dialogue system in which the agent makes an utterance based on at least contents of the user utterance or an immediately preceding utterance made by the user or agent or an utterance made in the vicinity thereof. These chat-oriented dialogue systems can explicitly respond to the user utterances.

PRIOR ART LITERATURE

Non-Patent Literature

Non-Patent Literature 1: Tatsuya Kawahara, "Voice Dialog System Using Spoken Language," Information Processing, vol. 45, no. 10, pp. 1027-1031, October 2004

Non-Patent Literature 2: Tsunehiro Arimoto, Yuichiro Yoshikawa, Hiroshi Ishiguro, "Impression Evaluation of Dialog without Voice Recognition by Plural Robots," Conference of the Robotics Society of Japan, 2016

Non-Patent Literature 3: Hiroaki Sugiyama, Toyomi Meguro, Ryuichiro Higashinaka, Yasuhiro Minami, "Leveraging Dependency Relations and Sentence Examples in Web-scale Corpus for Open-domain Utterance Generation," Transactions of the Japanese Society for Artificial Intelligence, vol. 30 (1), pp. 183-194, 2015

Non-Patent Literature 4: Toyomi Meguro, Hiroaki Sugiyama, Ryuichiro Higashinaka, Yasuhiro Minami, "Building a conversational system based on the fusion of rule-based and stochastic utterance generation," Transactions of the Japanese Society for Artificial Intelligence, vol. 28, pp. 1-4, 2014

SUMMARY OF THE INVENTION

Problems to be Solved by the Invention

However, utterances generated through voice synthesis may be hard to listen to because of poor, for example, intonation, long utterance sentences or the like. In such a case, the user may distract attention from the agent. Furthermore, contents of an utterance decided by the dialogue system may get out of context of a dialogue, preventing the user from understanding the contents. In such a case, the user may express, by means of an utterance or movement, that the user cannot understand the utterance of the agent. In response to this, even if the same agent utters the same contents repeatedly, it is not possible to improve the ease of understanding. Furthermore, if the same agent does nothing but repeat the same contents, this may be deemed that the agent has no intention to explain. Especially when the user cannot agree with contents of the utterance of the agent, such a tendency becomes remarkable.

In view of the above-described points, it is an object of the present invention to implement a dialogue system and a dialogue apparatus capable of promoting, when the user does not understand an utterance from a dialogue system, the user's understanding and causing the dialogue to last long.

Means to Solve the Problem

In order to solve the above-described problem, a dialogue method according to a first aspect of the present invention is a dialogue method carried out by a dialogue system that conducts a dialogue with a user, the dialogue method comprising: a first presentation step in which a presentation part presents a first utterance which is a certain utterance; and a second presentation step in which the presentation part presents a second utterance which is at least one utterance resulting from paraphrasing contents of the first utterance when the user performs an action indicating that the user cannot understand the first utterance, when it is predicted that the user will perform an action indicating that the user cannot understand the first utterance, when the user does not perform any action indicating that the user can understand the first utterance, or when it is predicted that the user will not perform any action indicating that the user can understand the first utterance.

A dialogue method according to a second aspect of the present invention is a dialogue method carried out by a dialogue system that conducts a dialogue with a user, the dialogue method comprising: a first presentation step in which a presentation part presents a first utterance which is a certain utterance by a first personality that is a certain personality; and a second presentation step in which the presentation part presents a second utterance which is at least one utterance having same contents as the first utterance by a second personality that is different from the first personality when the user performs an action indicating that the user cannot understand the first utterance, when it is predicted that the user will perform an action indicating that the user cannot understand the first utterance, when the user does not perform any action indicating that the user can understand the first utterance, or when it is predicted that the user will not perform any action indicating that the user can understand the first utterance.

Effects of the Invention

When the user performs an action indicating that the user cannot understand an utterance from the dialogue system or when it is predicted that the user will perform an action indicating that the user cannot understand the utterance or when the user does not perform any action indicating that the user can understand the utterance or when it is predicted that the user will not perform any action indicating that the user can understand the utterance, the present invention makes a different utterance resulting from paraphrasing contents of an immediately preceding utterance or an utterance having contents of an immediately preceding utterance by a personality that is different from the personality that made the immediately preceding utterance or an utterance having contents resulting from paraphrasing the contents of the immediately preceding utterance, and can thereby implement a dialogue system and a dialogue apparatus capable of promoting the user's understanding and causing the dialogue to last long.

DETAILED DESCRIPTION OF THE EMBODIMENTS

Figure 1:
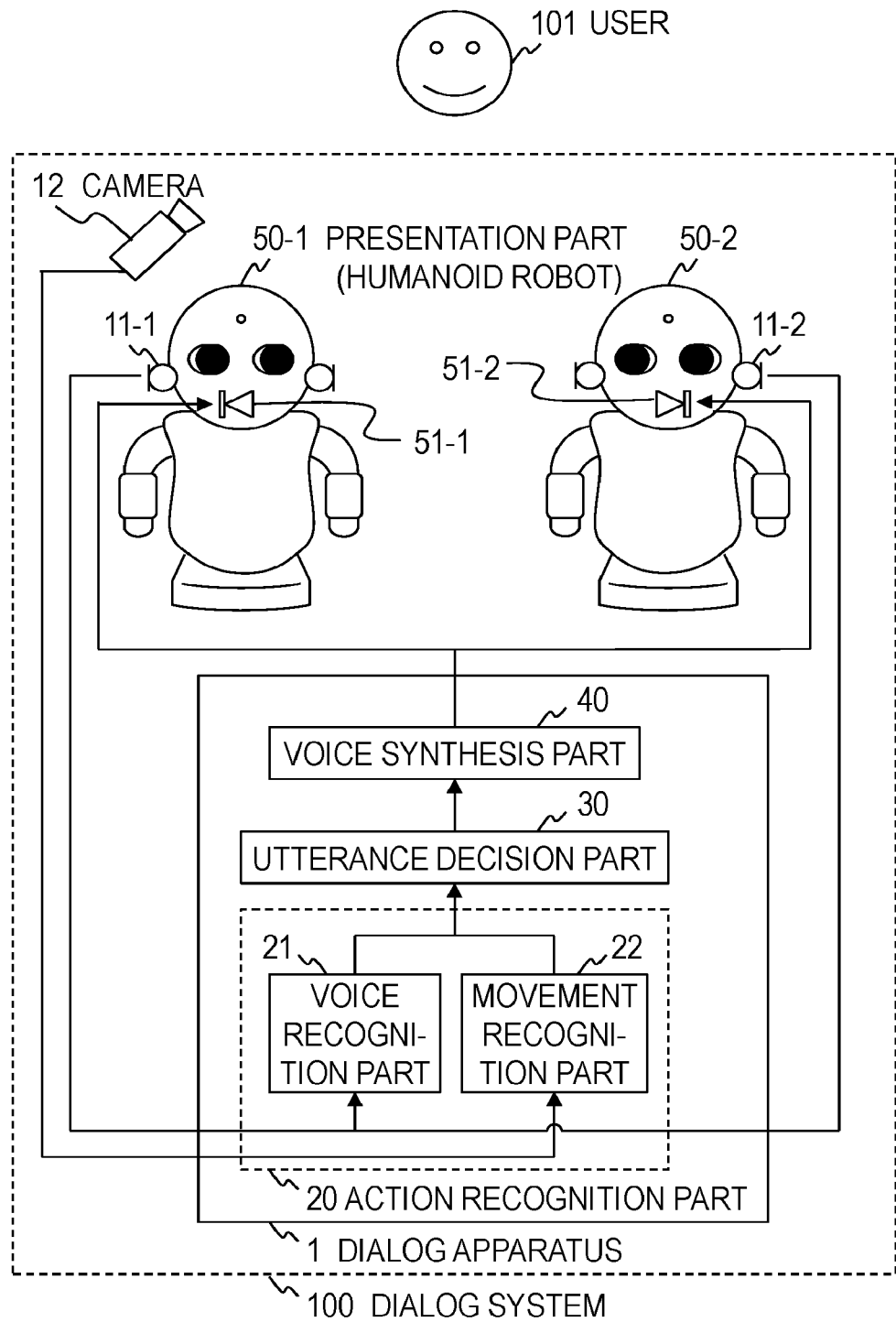
FIG. 1 is a diagram illustrating a functional configuration of a dialogue system of an embodiment.

When the user performs an action indicating that the user cannot understand an utterance presented by a dialogue system or when it is predicted that the user will perform an action indicating that the user cannot understand the utterance or when the user does not perform any action indicating that the user can understand the utterance or when it is predicted that the user will not perform any action indicating that the user can understand the utterance, the present invention promotes the user's understanding or agreement through paraphrasing such as a change of length of an utterance sentence, a change of length of utterance time, addition or omission of a logic or division of a sentence. The case where the user cannot understand includes more specifically: 1. a case where the user cannot grasp a meaning of an utterance sentence (that is, a meaning that the utterance sentence intends to express), 2. a case where the user can grasp a meaning of an utterance sentence but the user cannot agree with (or is unconvinced of) the meaning of the utterance sentence, and 3. a case where the user can grasp a meaning of an utterance sentence but the user cannot grasp the intention behind the utterance with the meaning of the sentence. An explanation with a paraphrase utterance performed in a dialogue among a plurality of agents (hereinafter also referred to as "personalities") can further improve a degree of understanding. Furthermore, when a personality other than the personality that made the utterance makes an utterance in tune with the inability to understand, the situation in which only the user is unable to understand ceases to exist, and the degree of dialogue satisfaction thereby improves. When the other personality asks a question at this time, the direction of the dialogue can be determined naturally, making it easier to provide subsequent scenarios. When the user expresses an action indicating that the user cannot agree with the meaning of the utterance, the other personality presents an utterance indicating an agreement with the original utterance, and it is thereby possible to cause the dialogue to proceed with a topic for which an agreement is formed by forced majority decision.

Hereinafter, embodiments of the present invention will be described in detail. Note that components having the same functions in the accompanying drawings are assigned the same reference numerals and overlapping description will be omitted.

The dialogue system according to the embodiment is a system in which at least one humanoid robot conducts a dialogue with a user. That is, the dialogue system according to the embodiment is an example where the agent is a humanoid robot. As shown in FIG. 1, a dialogue system 100 includes, for example, a dialogue apparatus 1, an input part 10 constructed of a microphone 11 and a camera 12 and a presentation part 50 provided with at least a speaker 51. The dialogue apparatus 1 is provided with, for example, an action recognition part 20, an utterance decision part 30 and a voice synthesis part 40. The action recognition part 20 is provided with, for example, a voice recognition part 21 and a movement recognition part 22. The dialogue system 100 executes processes in respective steps, which will be described later, and the dialogue method according to the embodiment is thereby implemented.

The dialogue apparatus 1 is a special apparatus configured by causing a well-known or dedicated computer provided with, for example, a central processing unit (CPU) and a main storage apparatus (RAM: Random Access Memory) to read a special program. The dialogue apparatus 1, for example, executes each process under the control of the central processing unit. Data inputted to the dialogue apparatus 1 and data obtained through each process are stored, for example, in the main storage apparatus, and the data stored in the main storage apparatus is read as required and used for other processes. Furthermore, at least part of each processing part of the dialogue apparatus 1 may be constructed of hardware such as an integrated circuit.

[Input Part 10]

The input part 10 may be configured to be integral with or partially integral with the presentation part 50. In the example in FIG. 1, microphones 11-1 and 11-2 which are parts of the input part 10 are mounted on the heads (positions of the ears) of humanoid robots 50-1 and 50-2 which are the presentation parts 50. In the example in FIG. 1, the camera 12 which is a part of the input part 10 is provided independently, but, for example, the camera 12 may be mounted on the heads (positions of the eyes) of the humanoid robots 50-1 and 50-2. In the example in FIG. 1, the presentation part 50 is constructed of two humanoid robots 50-1 and 50-2, but the presentation part 50 may also be constructed of one humanoid robot or three or more humanoid robots.

The input part 10 is an interface for the dialogue system 100 to acquire at least one of an utterance (verbal action) and a movement (non-verbal action) of the user. In other words, the input part 10 is an interface to input a user action to the dialogue system 100. For example, the input part 10 is the microphone 11 to collect an utterance voice of the user and convert it to a voice signal. When the input part 10 is a microphone, it may be enabled to collect an utterance voice uttered by the user 101. That is, FIG. 1 is an example, and one of the microphones 11-1 and 11-2 may not be provided. Furthermore, one or more microphones provided in places different from the humanoid robots 50-1 and 50-2 in the vicinity of the user 101 or a microphone array provided with a plurality of microphones are used as the input part so as to adopt a configuration not provided with both the microphones 11-1 and 11-2. The microphone 11 outputs an acoustic signal obtained through the conversion. The acoustic signal outputted from the microphone 11 is inputted to the voice recognition part 21 of the action recognition part 20. For example, the input part 10 is the camera 12 to record physical movements of the user and convert the physical movements to video signals. When the input part 10 is a camera, the camera may be enabled to record physical movements of the user 101. That is, FIG. 1 is an example, and the camera 12 may be one camera or a plurality of cameras. The camera 12 outputs the video signals obtained through the conversion. The video signal outputted from the camera 12 is inputted to the movement recognition part 22 of the action recognition part 20.

[Action Recognition Part 20]

The action recognition part 20 receives at least one of the acoustic signal collected by the microphone 11 and the video signal recorded by the camera 12 as input, uses at least one of the voice recognition part 21 and the movement recognition part 22, obtains information representing contents of the user action and outputs the information to the utterance decision part 30.

[Voice Recognition Part 21]

The voice recognition part 21 voice-recognizes the acoustic signal inputted from the microphone 11 and outputs text obtained as the recognition result. The text outputted from the voice recognition part 21 is included in the information representing contents of the user action outputted from the action recognition part 20. The voice recognition method carried out by the voice recognition part 21 may be any existing voice recognition technique or an optimum one may be selected as appropriate in accordance with an operating environment or the like. Note that when no voice is included in the acoustic signal, no text is obtained as the recognition result, and so the voice recognition part 21 does not output any text and no text is included in the information representing contents of the user action outputted from the action recognition part 20.

[Movement Recognition Part 22]

The movement recognition part 22 recognizes movement of the video signal inputted from the camera 12, obtains information representing contents of the user movement and outputs the information. The information representing contents of the user movement outputted from the movement recognition part 22 is included in the information representing contents of the user action outputted from the action recognition part 20. The movement recognition method carried out by the movement recognition part 22 is, for example, a method using a change in user expressions or the like. According to this method, the movement recognition part 22 acquires time-sequential images of the user's face from the inputted video signal and acquires contents of the user's movement which are variations of features (e.g., size of the pupil, position of the tail of the eye, positions of the eyes, position of angle of mouth, degree of opening of mouth) from the acquired time-sequential images. The movement recognition part 22 obtains contents of the user movement corresponding to each time in the inputted video signal, generates time-sequential data representing contents of the user movement and outputs the generated time-sequential data as information representing contents of the user movement. However, the above-described movement recognition method is an example, and the movement recognition method carried out by the movement recognition part 22 may be any existing movement recognition technique or an optimum one may be selected as appropriate in accordance with an operating environment or the like.

[Utterance Decision Part 30]

The utterance decision part 30 decides text representing utterance contents from the dialogue system 100 and outputs the text to the voice synthesis part 40. When information representing contents of the user action is inputted from the action recognition part 20, the utterance decision part 30 decides text representing the utterance contents from the dialogue system 100 based on the information representing the inputted contents of the user action and outputs the text to the voice synthesis part 40. Note that when the presentation part 50 of the dialogue system 100 is constructed of a plurality of humanoid robots, the utterance decision part 30 may decide which humanoid robot presents the utterance. In this case, the utterance decision part 30 also outputs information indicating the humanoid robot that presents the utterance together to the voice synthesis part 40. In this case, the utterance decision part 30 may decide the partner to whom the utterance is presented, that is, whether the utterance is presented to the user or to any one humanoid robot. In this case, the utterance decision part 30 outputs the information indicating the partner to whom the utterance is presented together to the voice synthesis part 40.

[Voice Synthesis Part 40]

The voice synthesis part 40 converts text representing the utterance contents inputted from the utterance decision part 30 to a voice signal representing the utterance contents and outputs the voice signal to the presentation part 50. The method for voice synthesis carried out by the voice synthesis part 40 can be any existing voice synthesis technique and a most suitable one may be selected as appropriate in accordance with the usage environment or the like. Note that when information indicating the humanoid robot that presents the utterance is inputted from the utterance decision part 30 together with the text representing the utterance contents, the voice synthesis part 40 outputs a voice signal representing the utterance contents to the humanoid robot corresponding to the information. Furthermore, when information indicating a partner to whom the utterance is presented is also inputted together with the text representing the utterance contents and information indicating the humanoid robot that presents the utterance from the utterance decision part 30, the voice synthesis part 40 outputs the voice signal representing the utterance contents and the information indicating the partner to whom the utterance is presented to the humanoid robot corresponding to the information.

[Presentation Part 50]

The presentation part 50 is an interface for the utterance decision part 30 to present the decided utterance contents to the user. For example, the presentation part 50 is a humanoid robot manufactured by imitating the human form. This humanoid robot pronounces the voice corresponding to a voice signal representing the utterance contents inputted from the voice synthesis part 40 from the speaker 51 mounted on, for example, the head. That is, the humanoid robot presents the utterance. The speaker 51 may be enabled to pronounce the voice corresponding to the voice signal representing the utterance contents inputted from the voice synthesis part 40. That is, FIG. 1 is an example and either one of the speaker 51-1 or 51-2 may not be provided. A configuration may also be adopted in which one or more speakers or a speaker array provided with a plurality of speakers are provided in places different from the humanoid robots 50-1 and 50-2 in the vicinity of the user 101 or the like, but both the speakers 51-1 and 51-2 are not provided. Furthermore, the humanoid robot may present the utterance contents decided by the utterance decision part 30 through nonverbal action such as facial expressions and physical movement to the user. For example, nonverbal action may be presented such as nodding the head vertically to present an agreement on an immediately preceding utterance or shaking the head horizontally to present a disagreement. When the presentation part 50 is a humanoid robot, one humanoid robot is provided for each personality joining the dialogue, for example. Hereinafter, it is assumed that there are two humanoid robots 50-1 and 50-2 as an example where two personalities join the dialogue. Note that when the utterance decision part 30 has already decided from which humanoid robot the utterance is presented, the humanoid robot 50-1 or 50-2 which receives a voice signal representing the utterance contents outputted from the voice synthesis part 40 presents the utterance. When the information indicating the partner to whom the utterance decided by the utterance decision part 30 is presented is also inputted, the humanoid robot 50-1 or 50-2 presents the utterance while directing its face or eyes in the utterance of the humanoid robot or user corresponding to the information indicating the partner to whom the utterance is presented.

Figure 2:
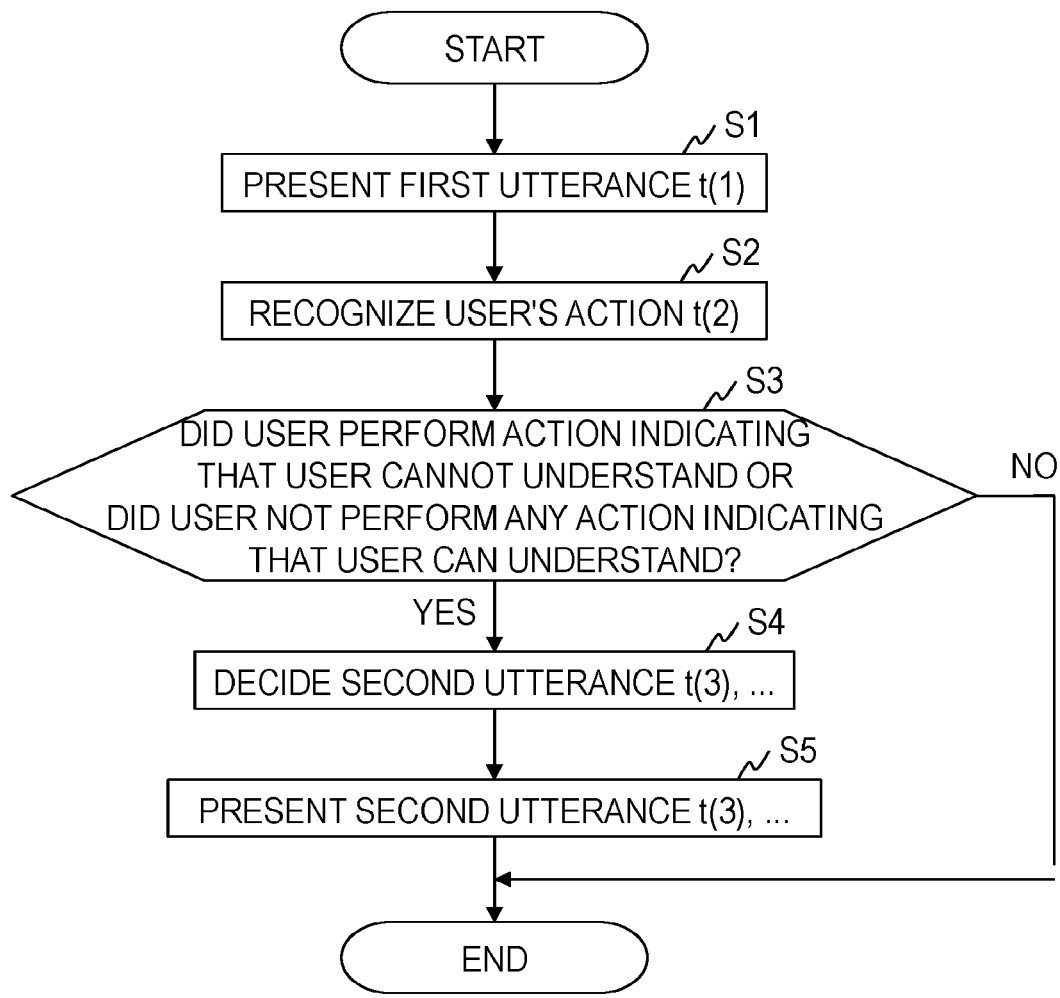
FIG. 2 is a diagram illustrating a processing procedure of a dialogue method of the embodiment.

Hereinafter, a processing procedure of the dialogue method of the embodiment will be described with reference to FIG. 2.

In step S1, the dialogue system 100 outputs the voice representing contents of a first utterance, which is a certain utterance, from the speaker 51-1 provided for the humanoid robot 50-1, that is, the dialogue system 100 presents the first utterance. The voice representing the contents of the first utterance is the text representing the contents of the first utterance decided by the utterance decision part 30 converted to a voice signal by the voice synthesis part 40. The utterance decision part 30 may arbitrarily select text representing the contents of the first utterance, for example, from among predetermined fixed phrases stored in a storage part (not shown) in the utterance decision part 30 or decided in accordance with the utterance contents up to the immediately preceding one. As for the technique of deciding the utterance contents in accordance with the utterance contents up to the immediately preceding one, one used in conventional dialogue systems may be used, and, for example, the scenario dialogue system described in Non-Patent Literature 2 or the chat-oriented dialogue system described in Non-Patent Literature 3 or 4 may be used. When the utterance decision part 30 uses the technique used in the scenario dialogue system, for example, the utterance decision part 30 selects, for a dialogue including five immediately preceding utterances, scenarios in which an inter-word distance between words included in each utterance and focus words constituting each utterance, and words and focus words included in each scenario stored in the storage part (not shown) in the utterance decision part 30 is shorter than a predetermined distance, selects text included in the selected scenario and thereby decides text representing contents of the first utterance. When the utterance decision part 30 uses a technique used in the chat-oriented dialogue system, the utterance decision part 30 may decide, for example, text representing contents of the first utterance according to a prescribed rule stored in the storage part (not shown) in the utterance decision part 30 using words included in the user utterance as a trigger, or automatically generate a rule based on words in a co-occurrence relation or dependency relation with words included the user utterance and decide the text representing the contents of the first utterance according to the rule.

In step S2, the action recognition part 20 obtains and outputs information representing contents of the user action based on at least one of the acoustic signal acquired by the microphone 11 and the video signal acquired by the camera 12, that is, the action recognition part 20 recognizes the user action, obtains and outputs information representing contents of the user action. The voice recognition part 21 in the action recognition part 20 voice-recognizes, for example, an acoustic signal corresponding to a predetermined time period after the presentation part 50 presents the first utterance among the acoustic signals acquired by the microphone 11 and outputs the text obtained as the recognition result as the text representing contents of the user utterance for the output of the action recognition part 20. The movement recognition part 22 in the action recognition part 20 recognizes, for example, the movement of the video signal corresponding to a predetermined time period after the presentation part 50 presents the first utterance among the video signals acquired by the camera 12 and outputs the time-sequential data representing contents of the user movement at each time obtained as the recognition result as the information representing contents of the user movement for the output of the action recognition part 20. Regarding the predetermined time period, a time enough to acquire the user's verbal action or non-verbal action to the first utterance may be set in advance, which is a predetermined time period of, for example, 1 second to 5 seconds.

In step S3, the utterance decision part 30 first detects that the user has performed an action indicating that the user cannot understand the first utterance or that the user has not performed any action indicating that the user can understand the first utterance based on the information representing contents of the user action (step S3-1). Here, for example, among actions expressed by the user, an action expressed after the dialogue system presents the first utterance is regarded as an action expressed by the user in response to the first utterance. That is, the utterance decision part 30 detects that the user has performed an action indicating that the user cannot understand the first utterance or that the user has not performed any action indicating that the user can understand the first utterance based on information representing contents of the user action after the dialogue system presents the first utterance of the information representing contents of the user action. Examples of cases where the user cannot understand contents of the first utterance include 1. a case where the user cannot grasp the meaning of the utterance sentence of the first utterance (that is, the meaning that the utterance sentence intends to express), 2. a case where the user can grasp the meaning of the utterance sentence of the first utterance but the user cannot agree with (or is not convinced of) the meaning of the utterance sentence and 3. a case where the user can grasp the meaning of the utterance sentence of the first utterance but the user cannot grasp the intention behind the utterance with the meaning. Examples of the case 1 where the user cannot grasp the meaning of the utterance sentence of the first utterance (that is, the meaning that the utterance sentence intends to express) include, for example, a case where contents of the first utterance are too difficult for the user to understand, a case where the user has not successfully listened to the voice of the first utterance, for example, due to influences of auditory quality of synthesis voice or errors in voice synthesis, and a case where the user has not listened to the first utterance. In step S3, when the utterance decision part 30 detects that the user has performed an action indicating that the user cannot understand the first utterance, or detects that the user has not performed any action indicating that the user can understand the first utterance (YES), the process proceeds to step S4. Otherwise (NO), the utterance decision part 30 ends the process (step S3-2).

When the utterance decision part 30 detects the action indicating that the user cannot understand the utterance based on the user's verbal action, the utterance decision part 30 detects the action, for example, as follows. The utterance decision part 30 acquires text representing contents of the user utterance from information representing contents of the user action and detects that the user has performed an action indicating that the user cannot understand the utterance when an expression stored in a storage part (not shown) in the utterance decision part 30, that is, a predetermined expression is included in the acquired text. When an expression expressing perplexity such as "I can't understand" or "what do you mean?" or an expression requesting for information again such as "please say one more time" is included in the user utterance in response to the utterance presented by the dialogue system, it can be considered that the user cannot understand the utterance presented by the dialogue system, and so these expressions are stored in the storage part (not shown) in the utterance decision part 30 as predetermined expressions.

When the utterance decision part 30 detects, based on the user's verbal action, that the user has not performed any action indicating that the user can understand the utterance, the utterance decision part 30 detects the action, for example, as follows. When no text is included in the information representing contents of the user action, the utterance decision part 30 detects that the user has not performed any action indicating that the user can understand the utterance. That is, when the user remains silent without uttering anything for a predetermined time period after the presentation part 50 presents the first utterance, the utterance decision part 30 detects that the user has not performed any action indicating that the user can understand the utterance.

When the utterance decision part 30 detects, based on a non-verbal action of the user, an action indicating that the user cannot understand the utterance, the utterance decision part 30, the utterance decision part 30 detects the action, for example, as follows. The utterance decision part 30 acquires information representing contents of the user action from the information representing contents of the user action, and if a predetermined movement stored in the storage part (not shown) in the utterance decision part 30 is included in the acquired movement, the utterance decision part 30 detects that the user has expressed an action indicating that the user cannot understand the utterance. When the movement expressed by the user immediately after the dialogue system presents the utterance includes movement such as a confused expression or inclination of the head, it is possible to consider that the user cannot understand the utterance presented by the dialogue system, and so these movements are stored in the storage part (not shown) in the utterance decision part 30 as predetermined movements.

Furthermore, an action indicating that the user cannot understand the utterance may also be detected based on a non-verbal action of the user, for example, as follows. Prior to the use of the dialogue system 100, a subject person is caused to listen to an utterance which is hard to understand in advance and changes in the feature before and after the utterance are stored in a storage part (not shown) in the utterance decision part 30. Note that the subject person means a subject to acquire a pattern of the changes in the feature and may be the user 101 of the dialogue system 100 or may be other people. Of the information representing contents of the user action, the dialogue system detects at least one of the fact that the user has performed an action indicating that the user cannot understand the first utterance and the fact that the user has not performed any action indicating that the user can understand the first utterance based on the information representing contents of the user action after the dialogue system presents the first utterance. The utterance decision part 30 calculates the similarity between changes in features stored in the storage part (not shown) in the utterance decision part 30 and the reaction of the user 101 inputted from the action recognition part 20 acquired in step S2 (changes in features of the user obtained based on contents of the user action before the dialogue system presents the first utterance and contents of the user action after the dialogue system presents the first utterance of the information representing contents of the user action), and upon determining that the contents of the user action are similar based on the magnitude relationship with a predetermined threshold stored in the storage part (not shown) in the utterance decision part 30, the utterance decision part 30 detects that the user has performed an action indicating that the user cannot understand the utterance. For example, when it is indicated that the higher the similarity, the more similar are the contents of the user action, the utterance decision part 30 determines that the contents of the user action are similar when the similarity is greater than the predetermined threshold and detects that the user has performed an action indicating that the user cannot understand the utterance.

As another example of step S3, the utterance decision part 30 detects that the user has performed an action indicating that the user cannot agree with the first utterance based on information representing contents of the user action (step S3'-1), and when it detects that the user has performed an action indicating that the user cannot agree with the first utterance (YES), the utterance decision part 30 may cause the process to proceed to step S4 or may end the process (step S3'-2) otherwise (NO).

As a further example of step S3, the utterance decision part 30 may execute following steps S3"-1 to S3"-4. As step S3"-1, the utterance decision part 30 first detects, based on information representing contents of the user action, the fact that the user has performed an action indicating that the user cannot understand the first utterance or the fact that the user has not performed any action indicating that the user can understand the first utterance. Next, as step S3"-2, upon detecting that the user has performed an action indicating that the user cannot understand the utterance or upon detecting that the user has not performed any action indicating that the user can understand the utterance (YES), the utterance decision part 30 causes the process to proceed to step S4 or the utterance decision part 30 causes the process to proceed to step S3"-3 otherwise (NO). When causing the process to proceed to step S3"-3, the utterance decision part 30 then detects the fact that the user has performed an action indicating that the user cannot agree with the first utterance as step S3"-3. Upon detecting the user has performed an action indicating that the user cannot agree with the first utterance as step S3"-4 (YES), the utterance decision part 30 causes the process to proceed to step S4 or ends the process otherwise (NO).

When the utterance decision part 30 detects an action indicating that the user cannot agree with the utterance based on a verbal action of the user, the utterance decision part 30 detects the action, for example, as follows. The utterance decision part 30 acquires text representing contents of the user utterance from the information representing contents of the user action, and when an expression stored in the storage part (not shown) in the utterance decision part 30, that is, a predetermined expression is included in the acquired text, the utterance decision part 30 detects that the user has expressed an action indicating that the user cannot agree with the utterance. When the user responds to the utterance presented by the dialogue system in a negative form or the user utterance includes words accompanying a negative meaning such as "different," "difficult" or "I wonder," it can be considered that the user cannot agree with the utterance presented by the dialogue system (see Reference Literature 1). Therefore, these expressions are stored in the storage part (not shown) in the utterance decision part 30 as predetermined expressions.

[Reference Literature 1] Masaki Ohno, Akiko Murakami, "Extraction of Agreement/Disagreement Expressions from Twitter," 18th annual meeting of the Association for Natural Language Processing, pp. 89-92, 2012.

When the utterance decision part 30 detects an action indicating that the user cannot agree with the utterance based on a non-verbal action of the user, the utterance decision part 30 detects the action, for example, as follows. The utterance decision part 30 acquires information representing contents of the user movement from the information representing contents of the user action and when a movement stored in the storage part (not shown) in the utterance decision part 30, that is, a predetermined movement is included in the acquired text, the utterance decision part 30 detects that the user has expressed an action indicating that the user cannot agree with the utterance. When the movement expressed by the user immediately after the dialogue system presents the utterance includes expressions such as frowning on the movement, shaking the head left and right, this can be considered that the user cannot agree with the utterance presented by the dialogue system (see Reference Literature 2). Therefore, these movements are stored in the storage part (not shown) in the utterance decision part 30 as predetermined movements.

[Reference Literature 2] Takashi Hirayama, Tetsuro Ohnishi, Eun-sun Park, Takashi Matsuyama, "Effects of Approach with Face-turning Action on Timing of Agreement/Disagreement Response in Human-human Interaction," Journal of Human Interface Society, 10(4), pp. 385-394, 2008.

In step S4, the utterance decision part 30 generates text representing contents of a second utterance resulting from paraphrasing text representing contents of the first utterance and outputs the generated text to the voice synthesis part 40. That is, when the user has performed an action indicating that the user cannot understand the utterance after the first utterance or when the user has not performed any action indicating that the user can understand the utterance after the first utterance, the utterance decision part 30 generates text representing contents of the second utterance resulting from paraphrasing text representing contents of the first utterance and outputs the text representing contents of the generated second utterance. The second utterance may be one utterance or a plurality of utterances.

"Paraphrasing" means converting a certain utterance to another expression. There are a variety of paraphrasing techniques such as 1. Change of the length of an utterance sentence, 2. Change of the length of an utterance time, 3. Addition or omission of a logic, 4. Division of a sentence and 5. Presentation by a plurality of personalities. Hereinafter, the respective techniques will be described in detail.

1. Change of the length of an utterance sentence means changing the length of the text representing contents of the second utterance to be larger or smaller than the length of the text representing contents of the first utterance without changing the meaning of a sentence of the text representing contents of the first utterance.

2. Change of the length of an utterance time means changing the length of the utterance time of a voice representing contents of the second utterance to be larger or smaller than the length of the utterance time of a voice representing contents of the first utterance without changing the text representing contents of the first utterance. Especially by making the utterance time longer and causing the utterance to be listened slowly, even if the text representing utterance contents is the same, the user's understanding can be expected to be easier.

3. Addition of a logic means adding a logic not included in the text representing contents of the first utterance to the text representing contents of the second utterance. On the contrary, omission of a logic means omitting a logic included in the text representing contents of the first utterance from the text representing contents of the second utterance.

4. Division of a sentence means dividing an utterance sentence included in text representing contents of the first utterance into a plurality of utterance sentences to form text representing contents of the second utterance including a plurality of utterance sentences. When complicated contents are spoken in one phrase at once and it is difficult to understand the contents, if the contents are divided into a plurality of utterances and caused to be listened to, the user's understanding can be expected to be easier. Especially by including an utterance with which it is easy for the user to chime in for at least one utterance which is not the last one among a plurality of utterances (e.g., the user is caused to answer simply "Yes"), whereby it is possible to create a gap in the dialogue and make the user's understanding easier. When a sentence is divided, not only one utterance sentence is divided but part of the divided utterance sentence may be shaped. The division of a sentence also includes a division into an utterance sentence describing difficult words included in the text representing contents of the first utterance and an utterance sentence paraphrased into easy-to-follow wording.

5. Presentation by a plurality of personalities means presenting the second utterance having the same contents as the first utterance by a personality that is different from the personality that presented the first utterance. For example, in a dialogue system including two humanoid robots 50-1 and 50-2, the text representing contents of the first utterance is outputted together with information indicating that the text is presented by the certain humanoid robot 50-1 and the text representing contents of the second utterance having the same contents as the first utterance is outputted together with information indicating that the text is presented by the different humanoid robot 50-2. Furthermore, this case also includes that the text representing contents of the second utterance includes a plurality of utterance sentences and the second utterance is presented shared by a plurality of humanoid robots. For example, assuming that the second utterance is constructed of four utterances t(3-1), t(3-2), t(3-3) and t(3-4), text representing contents of some parts t(3-1) and t(3-3) of the second utterance is outputted together with information indicating that the text is presented by the certain humanoid robot 50-1 and text representing parts t(3-2) and t(3-4) of the second utterance is outputted together with information indicating that the text is presented by the different humanoid robot 50-2.

The respective technique described above can be used not independently but by combining a plurality of those techniques for paraphrasing. For example, text representing utterance contents of a complicated first utterance may be converted to text representing simple utterance contents, part of the logic of which is omitted (3. Omission of a logic), and the text may be presented by extending the time length of a voice signal representing utterance contents (2. Extension of an utterance time). Moreover, a long utterance sentence included in the text representing the utterance contents of the first utterance may be divided into a plurality of utterance sentences (4. Division of sentence), the plurality of utterances corresponding to the respective utterance sentences may be presented shared among a plurality of personalities (5. Presentation by a plurality of personalities), and may also be presented by shortening the time length of a voice signal representing utterance contents of some utterances (2. Shortening of an utterance time).

Note that in step S3, when an action indicating that the user cannot agree with the utterance is detected, if the user expresses an action indicating that the user cannot agree with the utterance after the first utterance in step S4, the utterance decision part 30 generates text representing contents of the second utterance resulting from paraphrasing text representing contents of the first utterance and outputs the text representing the generated contents of the second utterance.

Upon detecting in step S3 the fact that the user has performed an action indicating that the user cannot understand the first utterance or the fact that the user has not performed any action indicating that the user can understand the first utterance or the fact that the user has performed an action indicating that the user cannot agree with first utterance, and upon detecting in step S4 the fact that the user has performed an action indicating that the user cannot understand the first utterance or the fact that the user has not performed an action indicating that the user can understand the first utterance, the utterance decision part 30 generates text representing contents of the second utterance resulting from paraphrasing text representing contents of the first utterance, outputs the text representing the generated contents of the second utterance or even when the user has performed an action indicating that the user cannot agree with the first utterance after the first utterance, the utterance decision part 30 generates text representing contents of the second utterance resulting from paraphrasing text representing contents of the first utterance and outputs text representing the generated contents of the second utterance.

In step S5, the voice synthesis part 40 converts text representing contents of the second utterance to a voice signal representing contents of the second utterance and outputs the voice signal to the presentation part 50, and the presentation part 50 outputs a voice corresponding to the voice signal representing contents of the second utterance inputted from the voice synthesis part 40 from the speaker 51-1 provided for the humanoid robot 50-1 or the speaker 51-2 provided for the humanoid robot 50-2. When information representing the humanoid robot that presents the second utterance together with text representing contents of the second utterance is inputted from the utterance decision part 30, the presentation part 50 outputs a voice representing the contents of the second utterance from the speaker 51 provided for the humanoid robots 50 corresponding to the information.

Hereinafter, the dialogue system makes an utterance having contents of the second utterances as a topic, and thereby continues a dialogue with the user. For example, when the second utterance is generated using a technique used in a scenario dialogue system, the dialogue system outputs a voice representing utterance contents of the scenario utterance decided using a technique used in the scenario dialogue system from the speaker so that a dialogue along the scenario selected using the technique used in the scenario dialogue system is performed between the user and the dialogue system. Furthermore, for example, when the second utterance is generated using a technique used in a chat-oriented dialogue system, the dialogue system outputs a voice representing utterance contents of a chat utterance decided using the technique used in the chat-oriented dialogue system based on the user utterance from the speaker. The humanoid robot that presents subsequent utterances may be one humanoid robot or a plurality of humanoid robots.

Although a case has been described in the above-described embodiment where the utterance decision part 30 generates a second utterance upon detecting that the user has performed an action indicating that the user cannot understand the first utterance after the first utterance or detecting that the user has not performed any action indicating that the user can understand the first utterance after the first utterance, the utterance decision part 30 may also generate a second utterance by predicting that the user will perform an action indicating that the user cannot understand the first utterance after the first utterance or predicting that the user will not perform any action indicating that the user can understand the first utterance after the first utterance. The "detection" means that the action recognition part 20 actually recognizes an action expressed by the user in response to the first utterance and the utterance decision part 30 determines, based on information representing contents of the action, whether or not the user has performed the desired action (or whether or not the user has not performed the desired action). On the other hand, the "prediction" means that the action recognition part 20 does not recognize an action expressed by the user in response to the first utterance and the utterance decision part 30 determines, based on information that can be acquired before presenting the first utterance, whether or not the user expresses the desired action (or whether or not the user does not express the desired action). In this case, aforementioned step S2 can be omitted.

When the user gives no response after the dialogue system presents the first utterance, this can be considered as an expression indicating that the user cannot agree with the first utterance. On the other hand, when the action has contents which cannot normally be agreed with in general societal terms or contents which can be anticipated to be disagreed with in view of the user's tastes acquired in advance, it is possible to predict, at the timing at which the dialogue system presents the first utterance, that the user will express that the user cannot agree with the first utterance. For example, when a first utterance with contents "skiing is not fun" is presented to the user who likes skiing, the user is more likely to express an action indicating that the user cannot agree with the first utterance. At this time, when there is no response from the user, even if there is an action indicating that the user cannot agree with the first utterance, it is the "detection" that will develop subsequent dialogues based on the action. On the other hand, it is the "prediction" that will develop subsequent dialogues by assuming, without using the user's response, that the user has performed an action indicating that the user cannot agree with the first utterance. That is, it is the "detection" that uses the action expressed by the user for the presentation of the first utterance (or uses the fact that the user will not express any desired action) and it is the "prediction" that does not use the action. Furthermore, the "prediction" also includes use of knowledge which can be acquired before presenting the first utterance.

That is, when the utterance decision part 30 performs prediction instead of detection, the utterance decision part 30 predicts that the user will perform an action indicating that the user cannot understand the first utterance or that the user will not perform any action indicating that the user can understand the first utterance, and if the utterance decision part 30 predicts that the user will perform an action indicating that the user cannot understand the first utterance or that the user will not perform any action indicating that the user can understand the first utterance, the utterance decision part 30 generates text representing contents of the second utterance resulting from paraphrasing text representing contents of the first utterance and outputs the text representing the generated contents of the second utterance.

SPECIFIC EXAMPLES

Hereinafter, specific examples of dialogue contents according to the embodiment will be described. Here, "R" represents a robot and "H" represents a user. A number after "R" is an identifier of a humanoid robot. t(i) (i=0, 1, 2, . . . ) represents an utterance or action during a dialogue, and especially t(1) represents a first utterance, t(2) represents a user action in response to the first utterance, t(3) represents a second utterance. The order of description of each utterance or action represents the order in which the utterance or action is presented or expressed. When each utterance is made up of a plurality of utterances, each utterance is represented by t(i-j). For example, when the second utterance includes three utterances, the second utterance is represented by t(3-1), t(3-2) and t(3-3).

Specific Example 1-1-1: Expressing that User Cannot Understand, Paraphrasing into Long Utterance Sentence t(0) H: Do you have any interesting news?
t(1) R1: It is expected that the ○○○ bill will be enacted.
t(2) H: What?
t(3) R1: The facilities where xxx are gathered are called ○○○, and the bill related to the facilities is expected to be enacted.
t(4) H: Hmm, I see.

In this example, the user H expresses an utterance t(2) indicating that the user H cannot understand a first utterance t(1) relating to a current event from the humanoid robot R1. In response to this, the humanoid robot R1 paraphrases it into contents describing a word ○○○ which is generally considered difficult to understand and presents a second utterance t(3) resulting from converting the remaining part to an utterance tone (e.g., by supplementing connection between nouns with a particle).

Specific Example 1-1-2: Expressing that User Cannot Understand, Paraphrasing into Long Utterance Sentence and Dividing Sentence t(0) H: Do you have any interesting news?
t(1) R1: It is expected that the ○○○ bill will be enacted.
t(2) H: What?
t(3-1) R1: The facilities where xxx are gathered are called ○○○,
t(3-2) R2: I see
t(3-3) R1: A bill related to the facilities is expected to be enacted.
t(3-4) R2: Hmm, I see.

Compared to Specific Example 1-1-1, the humanoid robot R1 breaks the second utterance t(3-1) in the middle and the humanoid robot R2 chimes in with t(3-2), thus creating enough time available for the user H to understand the utterance. Furthermore, the humanoid robot R2 presents utterances t(3-2) and t(3-4) indicating an agreement with the second utterances t(3-1) and t(3-3) of the humanoid robot R1 to thereby indicate that the majority understands the topic. This leads to the effect that it is possible to inhibit the user from further expressing that the user cannot understand the utterance.

Specific Example 1-2-1: Expressing that User Cannot Understand, Paraphrasing into Short Utterance Sentence, No. 1 t(0) H: Do you have any interesting news?
t(1) R1: It is expected that the ○○○ bill will be enacted.
t(2) H: What?
t(3-1) R1: Uh, I'm talking about the ΔΔΔ bill.
t(3-2) R2: Hmm, I see.

In this example, the dialogue system presents a second utterance t(3-1) resulting from paraphrasing the word ○○○ in the first utterance t(1) which is generally considered to be difficult to understand into another abbreviation ΔΔΔ which is more widely used, thus directly transmitting an overview of the topic. Furthermore, the humanoid robot R2 presents an utterance t(3-2) indicating that the humanoid robot R2 can understand the second utterance t(3-1) of the humanoid robot R1, and can thereby increase an impression that the utterance has been accepted in there. An example has been described here where the word ○○○ in the second utterance t(3-1) is changed to another abbreviation ΔΔΔ to be paraphrased into a short utterance sentence, but instead of changing to an abbreviation, adopting "Ah, I'm talking about the ○○○ bill" can correspond to paraphrasing into a short utterance sentence. In this case, the first utterance is paraphrased into a short utterance sentence in order to directly transmit the meaning of a sentence of the first utterance t(1).

Specific Example 1-2-2: Expressing that User Cannot Understand, Paraphrasing into Short Utterance Sentence, No. 2 t(0) H: Do you have any interesting news?
t(1) R1: It is expected that the ○○○ bill will be enacted.
t(2) H: What?
t(3-1) R2: Ah, are you talking about the ΔΔΔ bill?
t(3-2) R1: Oh yeah, you know well.

Compared to Specific Example 1-2-1, after expressing an utterance t(2) indicating that the user H cannot understand the utterance, the humanoid robot R2 which is different from the humanoid robot R1 that presented the first utterance t(1) presents a second utterance t(3-1) resulting from paraphrasing the word ○○○ which can be generally considered to be difficult to understand into an abbreviation ΔΔΔ In this case, the dialogue is such a dialogue based on the premise that the humanoid robot R2 also understands the topic, making it possible to demonstrate that the majority understands the topic.

Specific Example 2: Expressing that User Cannot Understand, Addition of Logic t(1) R1: Skiing is not fun, is it?
t(2) H: Why? Skiing is fun, isn't it?
t(3-1) R2: Because skiing easily gains speed, and that's fearful
t(3-2) R1: You are right, it is not easy to stop skiing and it's not fun.

In this example, the user H expresses an utterance t(2) indicating that the user cannot agree with the first utterance t(1) from the humanoid robot R1. In response to this, the humanoid robot R2 presents a second utterance t(3-1) to add the grounds for the first utterance t(1), demonstrating that the first utterance t(1) is supported by majority decision, and it is thereby possible to continue the dialogue assuming that the subsequent topics follow the first utterance t(1). In this example, the second utterance t(3-1) is presented by the humanoid robot R2, but the humanoid robot R1 that presented the first utterance t(1) may also present the second utterance t(3-1).

Specific Example 3: Not Expressing that the User can Understand the Utterance, Paraphrasing into Long Utterance Sentence t(0) H: Do you have any interesting news?
t(1) R1: It is expected that the ○○○ bill will be enacted.
t(2) H: (Silence, presenting no expression indicating that the user can understand)
t(3-1) R2: (Inclining the neck or the like and after a predetermined standby) What do you mean?

t(3-2) R1: The facilities where xxx are gathered are called ○○○, and the bill related to the facilities is expected to be enacted.

t(3-3) H: Hmm, I see.

In this example, the user H shows no reaction to the first utterance t(1) relating to the current event from the humanoid robot R1 and no action indicating that the user can understand the utterance is obtained for a predetermined time (on the order of 1 to 5 seconds). In response to this, the humanoid robot R2 presents a second utterance t(3-1) asking about the contents, and the humanoid robot R1 presents a second utterance t(3-2) resulting from paraphrasing it into contents describing the word ○○○ which is generally considered to be difficult to understand in response thereto. This makes it possible to continue the dialogue without any breakup.

[Modifications]

Although an example has been described in the aforementioned embodiments where a dialogue is conducted with voices using humanoid robots as agents, the presentation part of the aforementioned embodiments may be a humanoid robot having a physical body or the like or a robot without any physical body or the like. The dialogue technique of the present invention is not limited to the aforementioned ones, but it is also possible to adopt a form in which a dialogue is conducted using an agent provided with neither physical entity such as a humanoid robot nor vocalization mechanism. One such form is, for example, a form in which a dialogue is conducted using an agent displayed on a computer screen. More specifically, the present dialogue system is also applicable to a form in which in a group chat such as "LINE" (registered trademark) or "2 Channel" (registered trademark) whereby a plurality of accounts conduct dialogues using text messages, a dialogue is conducted between a user account and an account of a dialogue apparatus. In this form, the computer having a screen to display the agent needs to be located near a person, but the computer and the dialogue apparatus may be connected via a network such as the Internet. That is, the present dialogue system is applicable not only to dialogues actually made face to face between speakers such as a human and a robot, but also to dialogues made between speakers communicating with each other via a network.

Figure 3:
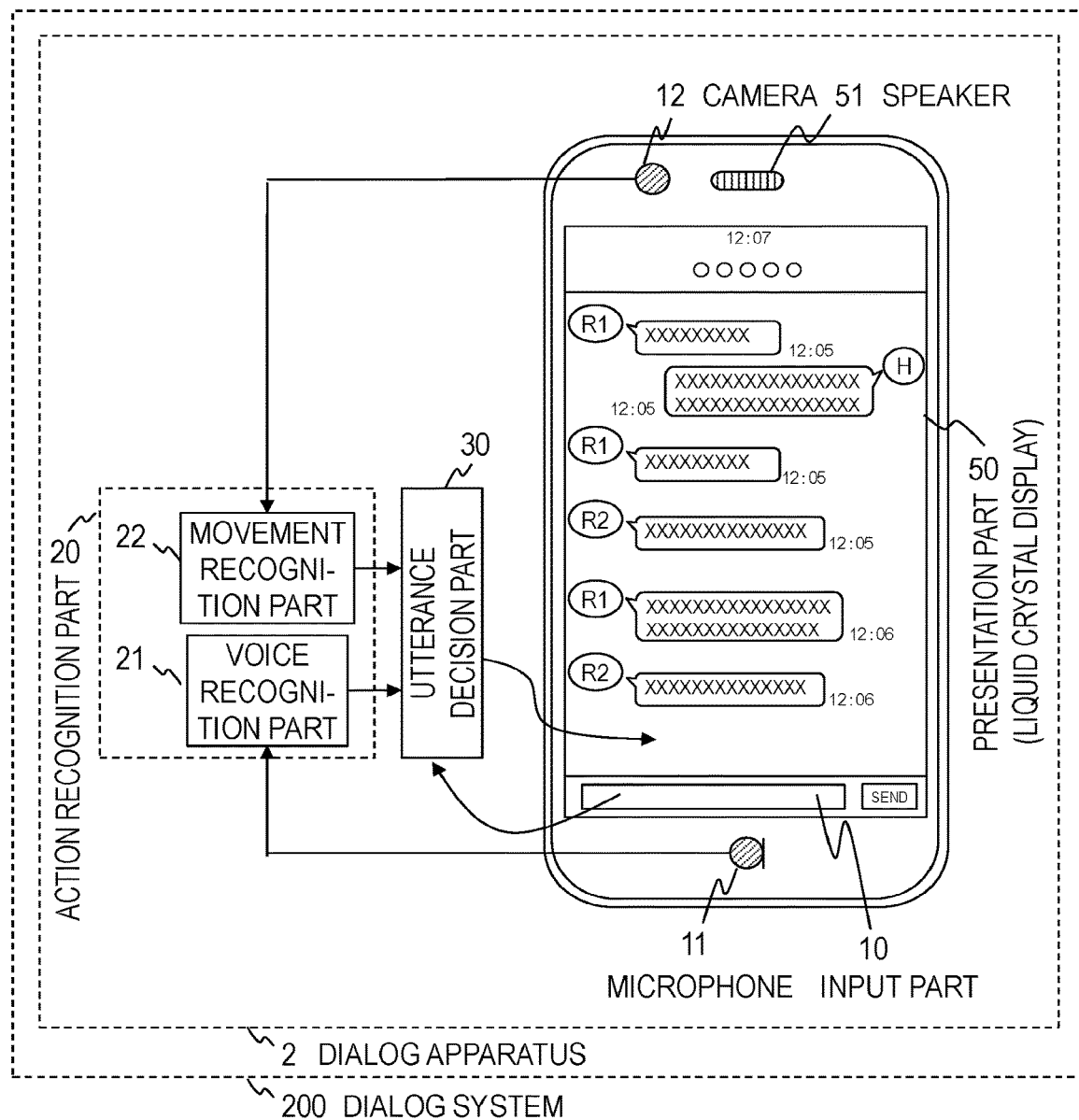
FIG. 3 is a diagram illustrating a functional configuration of a dialogue system according to a modification.

As shown in FIG. 3, a dialogue system 200 according to a modification is constructed of, for example, one dialogue apparatus 2. The dialogue apparatus 2 of the modification is provided with, for example, an input part 10, an action recognition part 20, an utterance decision part 30 and a presentation part 50. The action recognition part 20 is provided with, for example, a voice recognition part 21 and a movement recognition part 22. The dialogue apparatus 2 may also be provided with, for example, a microphone 11, a camera 12 and a speaker 51.

The dialogue apparatus 2 of the modification is an information processing apparatus such as a mobile terminal such as a smartphone or tablet or a desk top type or lap top type personal computer. The following description will be given assuming that the dialogue apparatus 2 is a smartphone. The presentation part 50 is a liquid crystal display provided for the smartphone. A window for a chat application is displayed on this liquid crystal display and dialogue contents of a group chat are displayed in a time sequence in the window. The group chat is a function whereby a plurality of accounts mutually contribute text messages in the chat and develop the dialogue. A plurality of virtual accounts corresponding to virtual personalities controlled by the dialogue apparatus 2 and the user's account participate in this group chat. That is, the present modification is an example of a case where the agent is a virtual account displayed on the liquid crystal display of the smartphone which is a dialogue apparatus. The user can input utterance contents to the input part 10 which is an input area provided in a window of the group chat using a software keyboard and contribute to the group chat through the own account. The utterance decision part 30 decides the utterance contents from the dialogue apparatus 2 based on the contribution from the user's account and contributes to the group chat through each virtual account. Note that a configuration may also be adopted in which the user verbally inputs utterance contents to the input part 10 using the microphone 11 and the voice recognition function mounted on the smartphone. Another configuration may also be adopted in which utterance contents obtained from each dialogue system are outputted from the speaker 51 with a voice corresponding to each virtual account using the speaker 51 and the voice synthesis function mounted on the smartphone.

Although the embodiments of the present invention have been described so far, the specific configuration is not limited to these embodiments, and it goes without saying that design changes or the like made as appropriate without departing from the spirit and scope of the present invention are included in the present invention. The various processes described above in the embodiments may be executed not only in time-sequentially according to the description order except the order of utterances presented by the presentation part, but also in parallel or individually according to a processing capacity of the apparatus that executes the processes or as required.

[Program and Recording Medium]

When the various processing functions of the respective apparatuses described in the above-described embodiments are implemented by a computer, processing contents of the functions that should be possessed by the respective apparatuses are written by a program. Furthermore, the various processing functions of the respective apparatuses are implemented on the computer by executing the program on the computer.

The program that writes the processing contents can be recorded in a computer-readable recording medium. Examples of the computer-readable recording medium include a magnetic recording apparatus, an optical disk, a magneto-optical recording medium, a semiconductor memory or any medium.

This program is distributed through, for example, sales, transfer or rental of a portable recording medium such as DVD or CD-ROM that records the program. The program may also be distributed by storing the program in a storage apparatus of a server computer, and transferring the program from the server computer to another computer.

The computer that executes such a program temporarily stores a program recorded in a portable storage medium or a program transferred from the server computer in the own storage apparatus. At the time of execution of the process, this computer reads the program stored in the own storage apparatus and executes the process according to the read program. As another form of execution of the program, the computer may read the program directly from a portable recording medium and execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program in the present form includes a semi-program which is information used for processing by a computer (data which is not a direct instruction on the computer but has a characteristic of defining processing of the computer).

In this form, although each apparatus is configured by executing a predetermined program on the computer, at least some of these processing contents may be implemented by hardware.

What is claimed is:

1. A dialogue method carried out by a dialogue system that conducts a dialogue with a user, the dialogue method comprising:
   a first presentation step in which a presentation part presents a first utterance which is a certain utterance;
   a second presentation step in which the presentation part executes when the user performs an action indicating that the user cannot understand the first utterance, or when it is predicted that the user will perform an action indicating that the user cannot understand the first utterance; and
   a third presentation step in which the presentation part executes after the second presentation step,
   wherein the presentation part presents, in the second presentation step, an action indicating that a second personality that is different from a first personality that is a personality that presents the first utterance cannot understand the first utterance, and
   the presentation part presents, in the third presentation step, a second utterance which is at least one utterance resulting from paraphrasing contents of the first utterance to the second personality by the first personality.

2. A non-transitory computer-readable recording medium having a program recorded thereon for causing a computer to execute each step of a dialogue method according to claim 1.

3. A dialogue system that conducts a dialogue with a user, the dialogue system comprising processing circuitry configured to:
   decide a first utterance which is a certain utterance and a second utterance which is at least one utterance resulting from paraphrasing contents of the first utterance; and
   present the first utterance, an action indicating that a second personality that is different from a first personality that is a personality that presents the first utterance cannot understand the first utterance when the user performs an action indicating that the user cannot understand the first utterance, or when it is predicted that the user will perform an action indicating that the user cannot understand the first utterance, and the second utterance to the second personality by the first personality after the action indicating that the user cannot understand the first utterance.

4. A dialogue apparatus that decides an utterance presented by a dialogue system that at least presents the utterance, the dialogue apparatus comprising at least a processing circuitry configured to decide:
   a first utterance which is a certain utterance; and
   a second utterance which is at least one utterance resulting from paraphrasing contents of the first utterance, to be presented to the second personality by the first personality after an action indicating that a second personality that is different from a first personality that is a personality that presents the first utterance cannot understand the first utterance, when the user performs an action indicating that the user cannot understand the first utterance, or when it is predicted that the user will perform an action indicating that the user cannot understand the first utterance.

5. A non-transitory computer-readable recording medium having a program recorded thereon for causing a computer to function as a dialogue apparatus according to claim 4.

6. A dialogue method carried out by a dialogue system that conducts a dialogue with a user, the dialogue method comprising:
   a first presentation step in which a presentation part presents a first utterance which is a certain utterance;
   a second presentation step in which the presentation part executes when the user performs an action indicating that the user cannot understand the first utterance, or when it is predicted that the user will perform an action indicating that the user cannot understand the first utterance; and
   a third presentation step in which the presentation part executes after the second presentation step,
   wherein the presentation part presents, in the second presentation step, an action indicating that a second personality that is different from a first personality that is a personality that presents the first utterance cannot understand the first utterance, and
   the presentation part presents, in the third presentation step, a second utterance which is at least one utterance resulting from paraphrasing contents of the first utterance by the first personality.

7. A non-transitory computer-readable recording medium having a program recorded thereon for causing a computer to execute each step of a dialogue method according to claim 6.

8. A dialogue system that conducts a dialogue with a user, the dialogue system comprising at least a processing circuitry configured to:
   decide a first utterance which is a certain utterance and a second utterance which is at least one utterance resulting from paraphrasing contents of the first utterance; and
   present the first utterance, an action indicating that a second personality that is different from a first personality that is a personality that presents the first utterance cannot understand the first utterance when the user performs an action indicating that the user cannot understand the first utterance, or when it is predicted that the user will perform an action indicating that the user cannot understand the first utterance, and the second utterance by the first personality after the action indicating that the user cannot understand the first utterance.

9. A dialogue apparatus that decides an utterance presented by a dialogue system that at least presents the utterance, the dialogue apparatus comprising at least a processing circuitry configured to decide:
   a first utterance which is a certain utterance; and
   a second utterance which is at least one utterance resulting from paraphrasing contents of the first utterance, to be presented by the first personality after an action indicating that a second personality that is different from a first personality that is a personality that presents the first utterance cannot understand the first utterance, when the user performs an action indicating that the user cannot understand the first utterance, or when it is predicted that the user will perform an action indicating that the user cannot understand the first utterance.

10. A non-transitory computer-readable recording medium having a program recorded thereon for causing a computer to function as a dialogue apparatus according to claim 9.

* * * * *